(12) United States Patent
Brooks et al.

(10) Patent No.: US 9,586,771 B2
(45) Date of Patent: Mar. 7, 2017

(54) VEHICLE RESTRAINTS WITH UNDERSIDE CATCHES

(71) Applicants: Andrew Brooks, Thiensville, WI (US); Ben Wieberdink, Cedar Grove, WI (US); Kyle Nelson, Cedarburg, WI (US); Norbert Hahn, Franklin, WI (US)

(72) Inventors: Andrew Brooks, Thiensville, WI (US); Ben Wieberdink, Cedar Grove, WI (US); Kyle Nelson, Cedarburg, WI (US); Norbert Hahn, Franklin, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 394 days.

(21) Appl. No.: 14/167,721

(22) Filed: Jan. 29, 2014

(65) Prior Publication Data
US 2015/0210487 A1    Jul. 30, 2015

(51) Int. Cl.
*B65G 69/00* (2006.01)
(52) U.S. Cl.
CPC ........ *B65G 69/003* (2013.01); *B65G 2207/40* (2013.01)
(58) Field of Classification Search
CPC .................................................. B65G 69/003
USPC ........................................ 414/401, 396, 584
See application file for complete search history.

(56) References Cited

U.S. PATENT DOCUMENTS

| 2,722,449 | A | 11/1955 | Harley |
| 4,208,161 | A | 6/1980 | Hipp et al. |
| 4,267,748 | A | 5/1981 | Grunewald et al. |
| 4,282,621 | A | 8/1981 | Anthony et al. |

(Continued)

FOREIGN PATENT DOCUMENTS

| CA | 2140743 | 6/1999 |
| CN | 1926034 | 3/2007 |

(Continued)

OTHER PUBLICATIONS

State Intellectual Property Office of the People'S Republic of China, "First Office Action," issued in connection with Chinese application serial No. 201280034260.X, issued Jan. 12, 2015, 18 pages.

(Continued)

*Primary Examiner* — Kaitlin Joerger
(74) *Attorney, Agent, or Firm* — Hanley, Flight & Zimmerman, LLC

(57) ABSTRACT

Vehicle restraints with underside catches are disclosed. An example vehicle restraint includes a main body and a barrier. The barrier includes a proximal end, and a distal end. The distal end is selectively movable to a first blocking position, a plurality of extended blocking positions, and a stored position. The example vehicle restraint also includes an engageable feature. The example vehicle restraint further includes a stop. The stop is to engage the engageable feature when the distal end is at the first blocking position while the stop is at a holding position. The stop is spaced apart from the engageable feature when the distal end is at the first blocking position while the stop is at a release position. The stop is spaced apart from the engageable feature when the distal end is in the stored position.

20 Claims, 15 Drawing Sheets

(56) References Cited

U.S. PATENT DOCUMENTS

| | | | |
|---|---|---|---|
| 4,373,847 A | 2/1983 | Hipp et al. | |
| 4,379,354 A | 4/1983 | Hahn et al. | |
| 4,472,099 A | 9/1984 | Hahn et al. | |
| 4,560,315 A | 12/1985 | Hahn | |
| 4,605,353 A | 8/1986 | Hahn et al. | |
| 4,648,781 A | 3/1987 | Sikora | |
| 4,674,941 A | 6/1987 | Hageman | |
| 4,759,678 A | 7/1988 | Hageman | |
| 4,843,373 A | 6/1989 | Trickle et al. | |
| 4,861,217 A | 8/1989 | Erlandsson | |
| 4,887,954 A | 12/1989 | Gregerson et al. | |
| RE33,242 E | 6/1990 | Hipp et al. | |
| 4,988,254 A | 1/1991 | Alexander | |
| 5,026,242 A | 6/1991 | Alexander | |
| 5,071,306 A | 12/1991 | Alexander | |
| 5,096,359 A | 3/1992 | Alexander | |
| 5,120,181 A | 6/1992 | Alexander | |
| 5,203,663 A | 4/1993 | Ruppe | |
| 5,297,921 A | 3/1994 | Springer et al. | |
| 5,340,181 A | 8/1994 | Matsuyama | |
| 5,348,437 A | 9/1994 | Krupke et al. | |
| 5,505,575 A | 4/1996 | Alexander | |
| 5,882,167 A * | 3/1999 | Hahn | B65G 69/003 414/396 |
| 6,106,212 A * | 8/2000 | Hahn | B65G 69/003 414/401 |
| 6,139,242 A | 10/2000 | Alexander | |
| 6,162,005 A | 12/2000 | Fritz | |
| 6,190,109 B1 * | 2/2001 | Bender | B65G 69/003 414/396 |
| 6,431,819 B1 | 8/2002 | Hahn | |
| 6,488,464 B1 * | 12/2002 | Kish | B65G 69/003 414/401 |
| 7,384,229 B2 * | 6/2008 | Gleason | B65G 69/003 414/401 |
| 7,841,823 B2 * | 11/2010 | Sveum | B65G 69/003 414/401 |
| 8,616,826 B2 * | 12/2013 | Cotton | B65G 69/003 414/401 |
| 9,145,273 B2 | 9/2015 | Brooks et al. | |
| 9,150,367 B2 | 10/2015 | Brooks et al. | |
| 9,174,811 B2 | 11/2015 | Proffitt et al. | |
| 9,227,799 B2 | 1/2016 | Brooks | |
| 2004/0042882 A1 | 3/2004 | Breen | |
| 2005/0169732 A1 | 8/2005 | Sveum et al. | |
| 2005/0196255 A1* | 9/2005 | Sveum | B65G 69/003 414/401 |
| 2006/0045678 A1 | 3/2006 | Andersen | |
| 2008/0095598 A1 | 4/2008 | Cotton et al. | |
| 2010/0266375 A1 | 10/2010 | Ion | |
| 2011/0158778 A1 | 6/2011 | Harrington | |
| 2011/0243693 A1* | 10/2011 | Brooks | B65G 69/003 414/401 |
| 2011/0243694 A1 | 10/2011 | Andersen et al. | |
| 2012/0087772 A1 | 4/2012 | Cotton et al. | |
| 2013/0017044 A1 | 1/2013 | Brooks et al. | |
| 2013/0017045 A1* | 1/2013 | Brooks | B65G 69/003 414/401 |
| 2014/0064891 A1* | 3/2014 | Brooks | B65G 69/003 414/401 |
| 2014/0064892 A1* | 3/2014 | Proffitt | B65G 69/003 414/401 |
| 2015/0217951 A1* | 8/2015 | Lessard | B65G 69/28 414/401 |

FOREIGN PATENT DOCUMENTS

| | | |
|---|---|---|
| WO | 2013009960 | 1/2013 |
| WO | 2014035727 | 3/2014 |

OTHER PUBLICATIONS

International Bureau, "International Preliminary Report on Patentability," issued in connection with International Patent Application No. PCT/US2013/055808, issued on Mar. 3, 2015, 8 pages.

IP Australia, "Patent Examination Report No. 1," issued in connection with Australian Patent Application No. 2012281071, dated Mar. 23, 2015, 3 pages.

Canadian Intellectual Property Office, "Office Action", issued in connection with Canadian Patent Application No. 2,840,237, dated Mar. 12, 2015 (3 pages).

IP Australia, "Notice of Acceptance," issued in connection with Application No. 2012281071, Nov. 6, 2015, 2 pages.

United States Patent and Trademark Office, "Corrected Notice of Allowability," issued in connection with U.S. Appl. No. 14/174,583, Nov. 24, 2015, 12 pages.

IP Australia, "Patent Examination Report No. 2," issued in connection with Application No. 2012281071, Sep. 9, 2015, 3 pages.

Canadian Intellectual Property Office, "Office Action", issued in connection with Canadian Patent Application No. 2,825,536, dated Mar. 31, 2015 (3 pages).

European Patent Office, "Extended European Search Report," issued in connection with European Patent Application No. 15000161.8, on Jun. 15, 2015, 11 pages.

European Patent Office, "Extended European Search Report," issued in connection with European Patent Application No. 15000162.6, on Jun. 15, 2015, 11 pages.

The United States Patent and Trademark Office, "Non-Final Office Action," issued in connection with U.S. Appl. No. 13/599,770, on Jun. 25, 2015, 48 pages.

The United States Patent and Trademark Office, "Notice of Allowance," issued in connection with U.S. Appl. No. 13/604,315, on Jun. 30, 2015, 33 pages.

State Intellectual Property Office, "Third Office Action," issued in connection with Application No. 201280034260.X, Jan. 26, 2016, 5 pages.

IP Australia, "Notice of Acceptance," issued in connection with Application No. 2015200158, Feb. 13, 2016, 2 pages.

International Bureau, "International Preliminary Report on Patentability," issued in connection with International application No. PCT/US2012/046416, mailed on Jan. 23, 2014, 8 pages.

International Searching Authority, "International Search Report," issued in connection with application serial No. PCT/US2012/046416, mailed Sep. 28, 2012, 5 pages.

International Searching Authority, "Written Opinion of the International Searching Authority," issued in connection with application serial No. PCT/US2012/046416, mailed Sep. 28, 2012, 7 pages.

Rite-Hite Holding Corporation, "G3 Posi-Lok," 4 Sheets drawings/text, Drawing #1262; Drawing #56158; dated Sep. 26, 1989.

United States Patent and Trademark Office, "Advisory Action," issued in connection with U.S. Appl. No. 13/233,884, mailed Jul. 19, 2013, 8 pages.

United States Patent and Trademark Office, "Final Office Action," issued in connection with U.S. Appl. No. 13/182,049, mailed Oct. 25, 2012, 10 pages.

United States Patent and Trademark Office, "Final Office Action," issued in connection with U.S. Appl. No.13/233,884, mailed Mar. 15, 2013, 13 pages.

United States Patent and Trademark Office, "Non-Final Office Action," issued in connection with U.S. Appl. No. 13/182,049, mailed Apr. 11, 2013, 18 pages.

United States Patent and Trademark Office, "Notice of Allowance and Fees Due," issued in connection with U.S. Appl. No. 13/182,049, mailed Jun. 23, 2014, 5 pages.

United States Patent and Trademark Office, "Notice of Allowance and Fees Due," issued in connection with U.S. Appl. No. 13/182,049, mailed Oct. 17, 2013, 18 pages.

United States Patent and Trademark Office. "Non-Final Office Action." issued in connection with U.S. Appl. No. 13/182,049, mailed Apr. 4, 2012, 14 pages.

(56) References Cited

OTHER PUBLICATIONS

United States Patent and Trademark Office. "Non-Final Office Action." issued in connection with U.S. Appl. No. 13/233,884, mailed Nov. 19, 2012, 21 pages.
United States Patent and Trademark Office. "Restriction Requirement." issued in connection with U.S. Appl. No. 13/233,884, mailed Jun. 19, 2014, 7 pages.
International Searching Authority, "International Search Report," issued in connection with International Application No. PCT/US2013/055808, Nov. 8, 2013, 4 pages.
International Searching Authority, "Written Opinion," issued in connection with International Application No. PCT/US2013/055808, Nov. 8, 2013, 7 pages.
Canadian Intellectual Property Office, "Notice of Allowance," issued in connection with Application No. 2,840,237, Dec. 15, 2015, 1 page.
Canadian Intellectual Property Office, "Notice of Allowance," issued in connection with Application No. 2,825,536, Jan. 6, 2016, 1 page.
IP Australia, "Notice of Acceptance," issued in connection with Application No. 2015200174, Jan. 21, 2016, 2 pages.
IP Australia, "Patent Examination Report No. 1," issued in connection with Application No. 2015200174, Sep. 14, 2015, 3 pages.
European Patent Office, "Communication pursuant to Rule 69 EPC," issued in connection with European Patent Application No. 15000162.6, Aug. 17, 2015, 2 pages.
European Patent Office, "Communication pursuant to Rule 69 EPC," issued in connection with European Patent Application No. 15000161.8, Aug. 10, 2015, 2 pages.
United States Patent and Trademark Office, "Notice of Allowance," issued in connection with U.S. Appl. No. 13/599,770, Sep. 29, 2015, 50 pages.
United States Patent and Trademark Office, "Notice of Allowance," issued in connection with U.S. Appl. No. 14/174,583, Oct. 5, 2015, 25 pages.
Mexican Patent Office, "Office Action," issued in connection with Application No. MX/a/2014/000282, Oct. 26, 2015, 2 pages.
Non-certified English language summary of "Office Action" issued by the Mexican Patent Office in connection with Application No. MX/a/2014/000282, Nov. 5, 2015, 1 page, Redacted.
State Intellectual Property Office of the People's Republic of China, "First Office Action," issued in connection with Chinese application serial No. 201280034260.X, issued Jan. 12, 2015 (18 pages).
International Searching Authority, "International Preliminary Report on Patentability," issued in connection with International Patent Application No. PCT/US2013/055808, issued on Mar. 3, 2015 (8 pages).

United States Patent and Trademark Office, "Non-Final Office Action," issued in connection with U.S. Appl. No. 14/174,583, mailed Jul. 15, 2015 (48 pages).
United States Patent and Trademark Office, "Supplemental Notice of Allowability," issued in connection U.S. Appl. No. 13/604,315, Jul. 15, 2015, 2 pages.
United States Patent and Trademark Office, "Second Supplemental Notice of Allowability," issued in connection U.S. Appl. No. 13/604,315, Aug. 18, 2015, 2 pages.
United States Patent and Trademark Office, "Third Supplemental Notice of Allowability," issued in connection U.S. Appl. No. 13/604,315, Aug. 21, 2015, 2 pages.
IP Australia, "Patent Examination Report No. 1," issued in connection with Australian Patent Application No. 2015200158, Aug. 26, 2015, 5 pages.
State Intellectual Property Office of the People's Republic of China, "Second Office Action," issued in connection with Chinese application serial No. 201280034260.X, issued Aug. 5, 2015, 16 pages.
United States Patent and Trademark Office, "Notice of Allowance," issued in connection with U.S. Appl. No. 13/182,049, mailed Jan. 20, 2015, 28 pages.
United States Patent and Trademark Office, "Non-Final Office Action," issued in connection with U.S. Appl. No. 13/233,884, mailed Nov. 19, 2014, 30 pages.
United States Patent and Trademark Office, "Non-Final Office Action," issued in connection with U.S. Appl. No. 13/604,315, mailed Feb. 5, 2015, 17 pages.
European Patent Office, "Communication under Rule 71(3) EPC", issued in connection with European patent application No. 15000162.6, Jun. 23, 2016, 59 pages.
European Patent Office, "Communication Pursuant to Article 94(3)", issued in connection with European patent application No. 15000161.8, Jun. 16, 2016, 6 pages.
Australian Patent Office, "Notice of Grant", issued in connection with Australian patent No. 2015200158, Jun. 9, 2016,1 page.
Australian Patent Office, "Notice of Grant", issued in connection with Australian patent No. 2015200174, May 19, 2016,1 page.
Canadian Intellectual Property Office, "Office Action," issued in connection with Application No. 2,881,444, Mar. 4, 2016, 5 pages.
Canadian Intellectual Property Office, "Office Action," issued in connection with Application No. 2,877,984, Feb. 26, 2016, 5 pages.
Canadian Intellectual Property Office, "Office Action," issued in connection with Application No. 2,882,355, Mar. 4, 2016, 4 pages.
IP Australia, "Notice of Grant," issued in connection with Application No. 2012281071, Mar. 3, 2016, 1 page.

\* cited by examiner

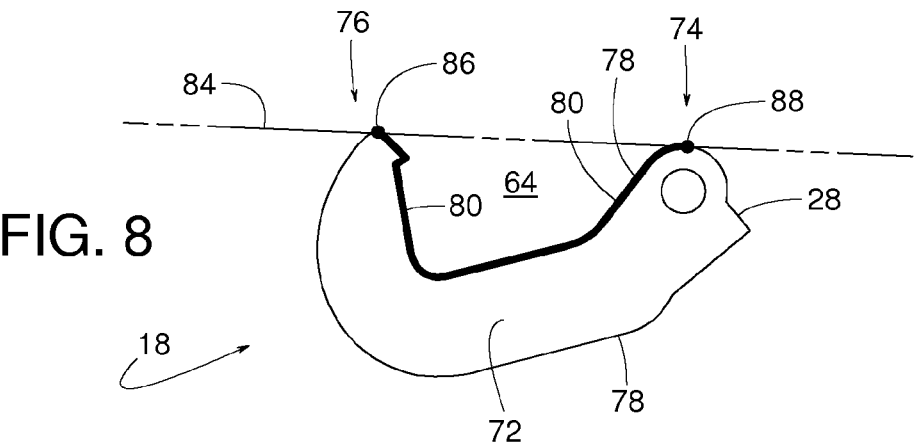
FIG. 8
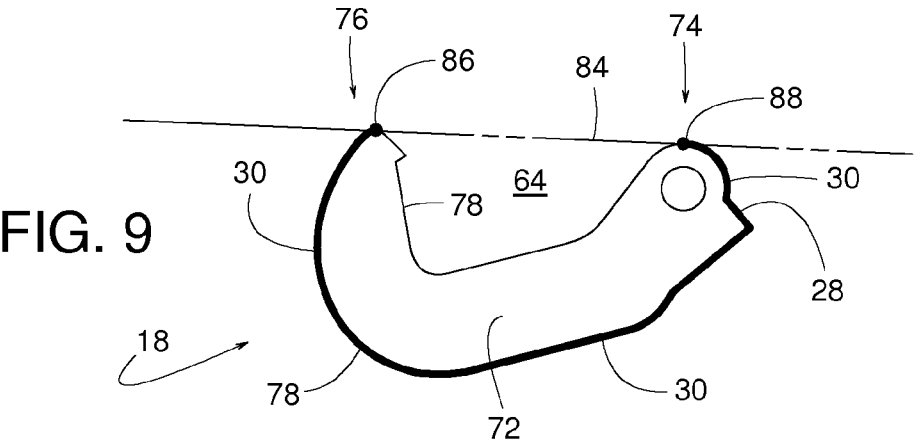
FIG. 9
FIG. 10     FIG. 11
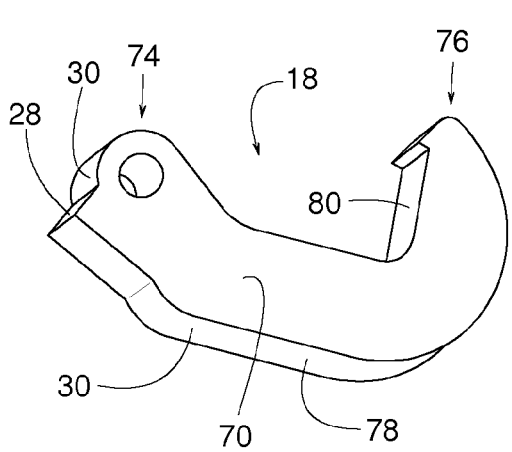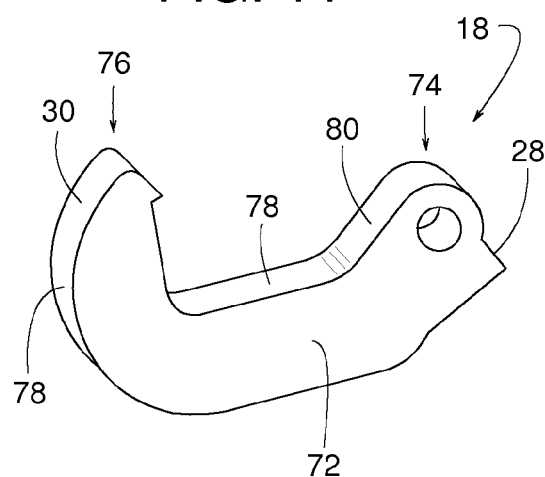

VEHICLE RESTRAINTS WITH UNDERSIDE CATCHES

FIELD OF THE DISCLOSURE

This patent relates generally to vehicle restraints and, more specifically, to vehicle restraints with underside catches.

BACKGROUND

When loading or unloading a truck parked at a loading dock, it is generally a safe practice to help restrain the truck from accidentally moving too far away from the dock. This is often accomplished by a hook-style vehicle restraint that engages what is often referred to in the industry as a truck's ICC bar (Interstate Commerce Commission bar) or RIG (Rear Impact Guard). An ICC bar or RIG comprises a bar or beam that extends horizontally across the rear of a truck, below the truck bed. Its primary purpose is to help prevent an automobile from under-riding the truck in a rear-end collision. A RIG, however, also provides a convenient structure for a hook-style restraint to reach up in front of the bar to obstruct the bar's movement away from the dock. To release the truck and prepare for the next one to enter, many restraints descend below the bar to a preparatory position.

Although the horizontal bar of a RIG is fairly standardized, the bar's supporting structure can vary significantly. In some cases, the supporting structure can interfere with the operation of the restraint. Some supporting structures can make it difficult for a vehicle restraint to sense the location of the bar and determine whether the bar is properly restrained.

BRIEF DESCRIPTION OF THE DRAWINGS

FIG. 8 is a diagram highlighting an operative edge of an example barrier.

FIG. 9 is a diagram highlighting a back edge of the example barrier shown in FIG. 8.

FIG. 10 is a perspective view of the example barrier shown in FIGS. 8 and 9.

FIG. 11 is another perspective view of the example barrier shown in FIGS. 8-10.

DETAILED DESCRIPTION

Figure 1:
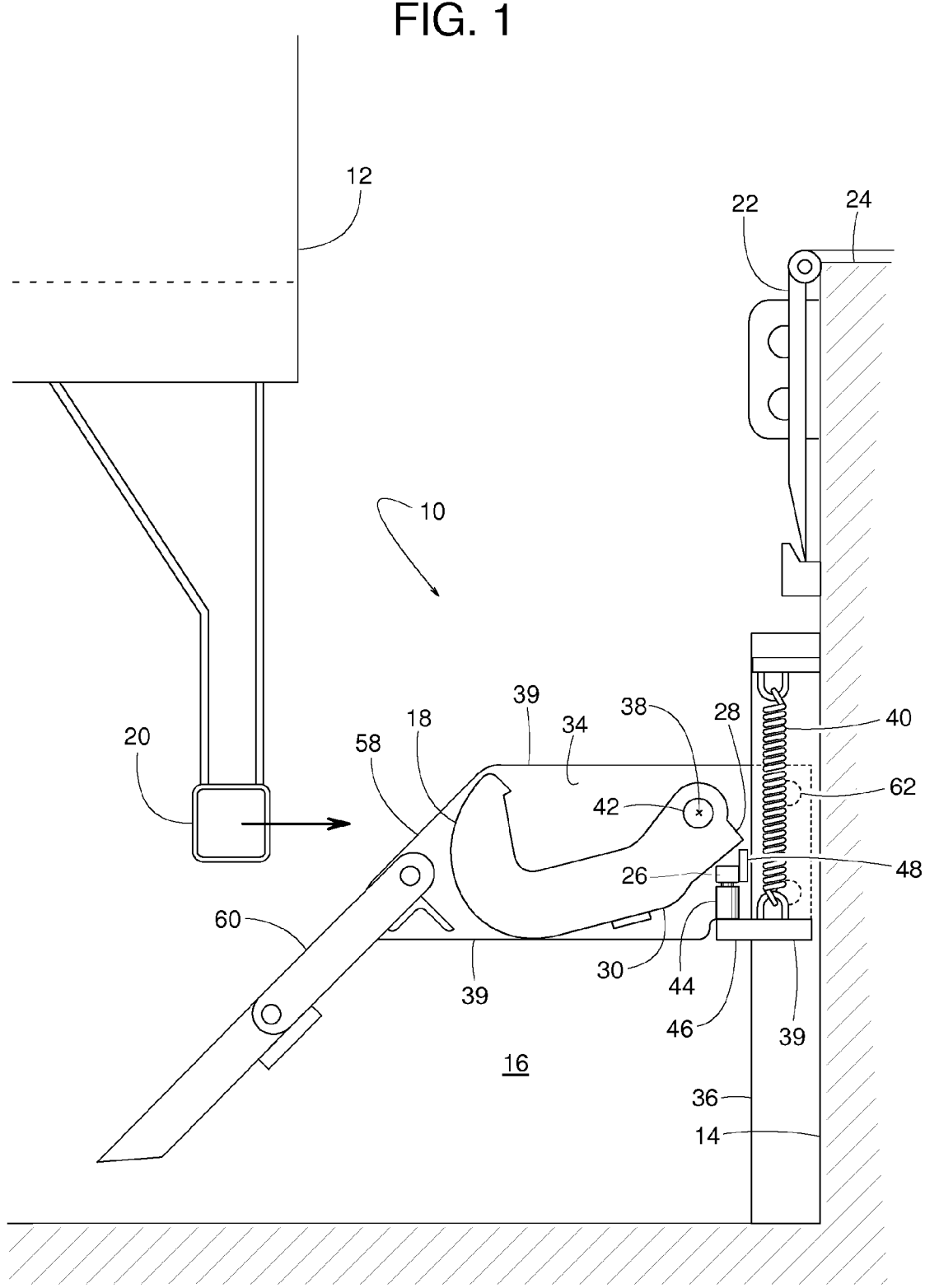
FIG. 1 is a side view of an example vehicle restraint with some parts omitted to show more clearly the inner workings of the example restraint.

Some example vehicle restraints disclosed herein include a pivotal barrier for blocking a vehicle's RIG (Rear Impact Guard) near the dock face of a loading dock. Some disclosed examples also include a movable stop that selectively engages a feature or structure on the barrier to limit the extent to which the barrier can withdraw from a plurality of extended blocking positions. To provide the restraint with a compact design; to help shield the stop and associated feature from contamination and impact; and/or to help reduce (e.g., prevent) the stop and feature from presenting an exposed pinch point, the feature is disposed on a back edge of the barrier in some disclosed examples. In some examples, the stop is located underneath the barrier in a generally inaccessible area between two plates of a main barrier-supporting body and is further positioned between a dock-mounted track and a pivotal axis of the barrier.

FIGS. 1-7, 12 and 13 show an example vehicle restraint 10 that helps reduce (e.g., prevent) a vehicle 12 (e.g., truck, trailer, etc.) from accidentally moving too far forward away from a dock face 14 of a loading dock 16 while cargo is being added to and/or removed from the vehicle 12. To limit such forward movement, the restraint 10 includes a barrier 18 for capturing or restraining the vehicle's RIG 20 (Rear Impact Guard), also known as an ICC bar (Interstate Commerce Commission bar). When the vehicle 12 is safely restrained, a dock leveler 22 can be deployed to provide a bridge across which forklifts and other material handling equipment can travel to transfer cargo between the vehicle 12 and an elevated platform 24 of the dock 16. The term, "RIG" encompasses the horizontal impact bar plus the framework or structure that connects the bar to the rest of the vehicle 12.

To ensure that the barrier 18 can positively the restrain RIG 20, the vehicle restraint 10 includes a stop 26 movable between a holding position (FIGS. 4, 5, 6, 12 and 13) and a release position (FIGS. 1, 2, 3 and 7) for selectively engaging and releasing an engageable feature or structure 28 of the barrier 18. When engaged, the stop 26 and the feature 28 limit the downward movement of the barrier 18 so that if the vehicle 12 attempts to depart the dock 16 prematurely, wherein the RIG 20 urges the barrier 18 back down toward its stored position, the feature 28 abutting the stop 26 holds the barrier 18 at a height sufficient to still restrain the RIG 20, as shown in FIGS. 4, 5, 12 and 13.

To provide the vehicle restraint 10 with a compact design; to help shield the stop 26 and the feature 28 from contamination and impact; and/or to help reduce (e.g., prevent) exposure of the anti-rotation catch mechanism of the stop 26 and the feature 28 as a pinch point, in some examples, the feature 28 is disposed on a back edge 30 of the barrier 18. In some examples, the stop 26 is compactly located underneath the barrier 18 in a generally inaccessible area between a first plate 32 and a second plate 34 of the vehicle restraint 10 and further between a dock-mounted track 36 and a pivotal axis 38 of the barrier 18. In some examples, the feature 28 is an integral protrusion or detent of the barrier 18 itself, whereby the barrier 18 and the feature 28 are a seamless unitary piece for robustness and ease of manufacture.

Although the actual design of the vehicle restraint 10 may vary, the illustrated example shows the vehicle restraint 10 including the track 36 attached to the dock face 14, a main body 39 comprising the plates 32, 34 mounted for vertical travel along the track 36, and one or more springs 40 that urge the main body 39 upward, and a shaft 42 pivotally connecting the barrier 18 to the main body 39 such that the barrier 18 can rotate about the axis 38 relative to the main body 39. In the illustrated examples, the vehicle restraint 10 also includes the stop 26, an actuator 44 (e.g., hydraulic cylinder, solenoid, spring, combinations thereof, etc.) for moving the stop 26, a base plate 46 that attaches the actuator 44 to the main body 39, and a backup support member 48 affixed to the main body 39 for reacting or absorbing a substantial force that the feature 28 may exert against the stop 26. To more clearly illustrate the inner workings of the vehicle restraint 10, the side plate 32 has been omitted in FIGS. 1-4, 6, 7, 12 and 13.

Some example operations of the vehicle restraint 10 follow the sequence of FIGS. 1, 2, 3, 4, 6 and 7. FIG. 1 shows the vehicle 12 backing into the dock 16 and approaching the vehicle restraint 10. At this point in the operation, as shown in the illustrated example of FIG. 1, the spring 40 holds the main body 39 at a raised preparatory position to receive the RIG 20. In some examples, to allow the vehicle 12 to move the RIG 20 back over the top of the barrier 18, the actuator 44 holds the stop 26 at its release position, and a drive unit 50 (e.g., hydraulic motor, electric motor, hydraulic cylinder, etc., as shown in FIG. 5) retracts the barrier 18 to its stored position relative to the main body 39. In this example, a drive train 52 couples an output shaft 54 of a motor 56 to the shaft 42, wherein the shaft 42 is keyed or otherwise affixed to the barrier 18 so that the shaft 42 and the barrier 18 rotate as a unit. In some examples, the drive motor 56, which can rotate in either direction, includes a slip coupling and is able to rotate the barrier 18 selectively to the barrier's stored position (FIGS. 1 and 2), to a first blocking position (e.g., FIGS. 4, 5, 7, 12 and 13), and further to a plurality of extended blocking positions (e.g., FIG. 3).

Figure 2:
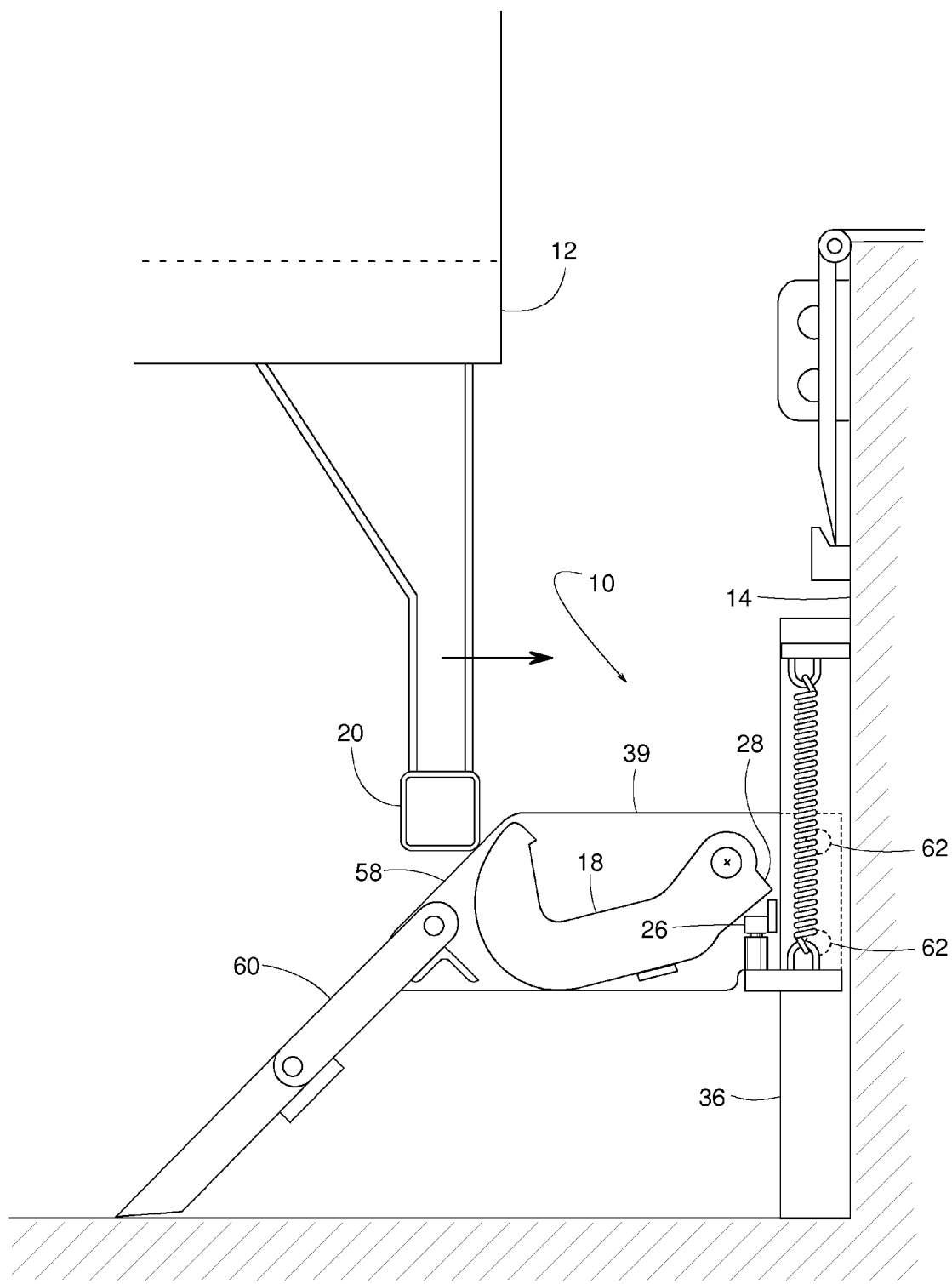
FIG. 2 is a side view similar to FIG. 1 but showing a vehicle pushing a main body of the example restraint downward.

Next, the illustrated example of FIG. 2 shows the vehicle 12 continuing to move back toward the dock face 14. Upon doing so, the RIG 20 forces the vehicle restraint's main body 39 downward by the RIG 20 sliding along a ramp portion 58 of the main body 39. In cases where the RIG 20 is exceptionally low, an articulated lead-in ramp extension 60 is used in some examples to guide the RIG 20 onto the ramp 58. In this example, a set of rollers 62 on main body 39 and extending into the track 36 reduces (e.g., minimizes) friction as the main body 39 travels vertically along the track 36. As the RIG 20 pushes the main body 39 down, as shown in the illustrated example of FIG. 2, the barrier 18 remains in its stored position while the stop 26 is in its release position.

Figure 3:
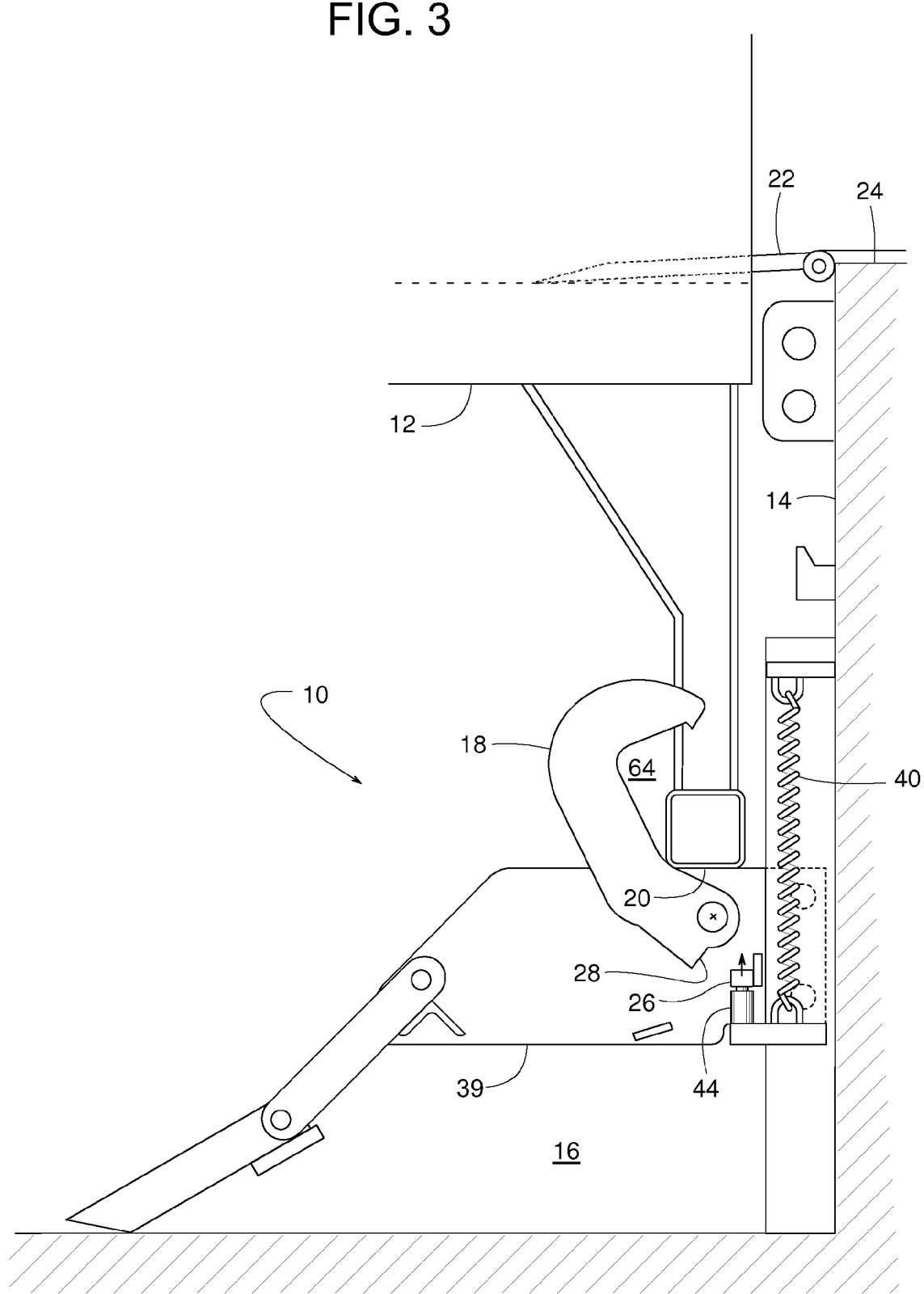
FIG. 3 is a side view similar to FIG. 1 but showing the example restraint's barrier blocking the vehicle's RIG.

In some examples, after the RIG 20 pushes the main body 39 down to an operative position (FIGS. 3-7, 12 and 13), and once the vehicle 12 moves the RIG 20 sufficiently close to the dock face 14, the drive motor 56 is activated to lift the barrier 18 to the extended blocking position shown in FIG. 3. In some examples, the actuator 44 subsequently lifts the stop 26 to its holding position. The barrier 18 has now captured the RIG 20 within a RIG-receiving area 64 of the barrier 18, thereby effectively restraining the vehicle 12 at the dock 16. If, while still being restrained, the vehicle 12 moves forward away from the dock face 14. In some examples, the RIG 20 might exert sufficient force to push the barrier 18 back down, by overcoming the friction of the drive motor's 56 slip coupling, but only as far as the first blocking position of the barrier 18 because the barrier's feature 28 encountering the stop 26 provides a solid mechanical engagement that limits further downward movement of the barrier 18, as shown in FIG. 4.

Figure 4:
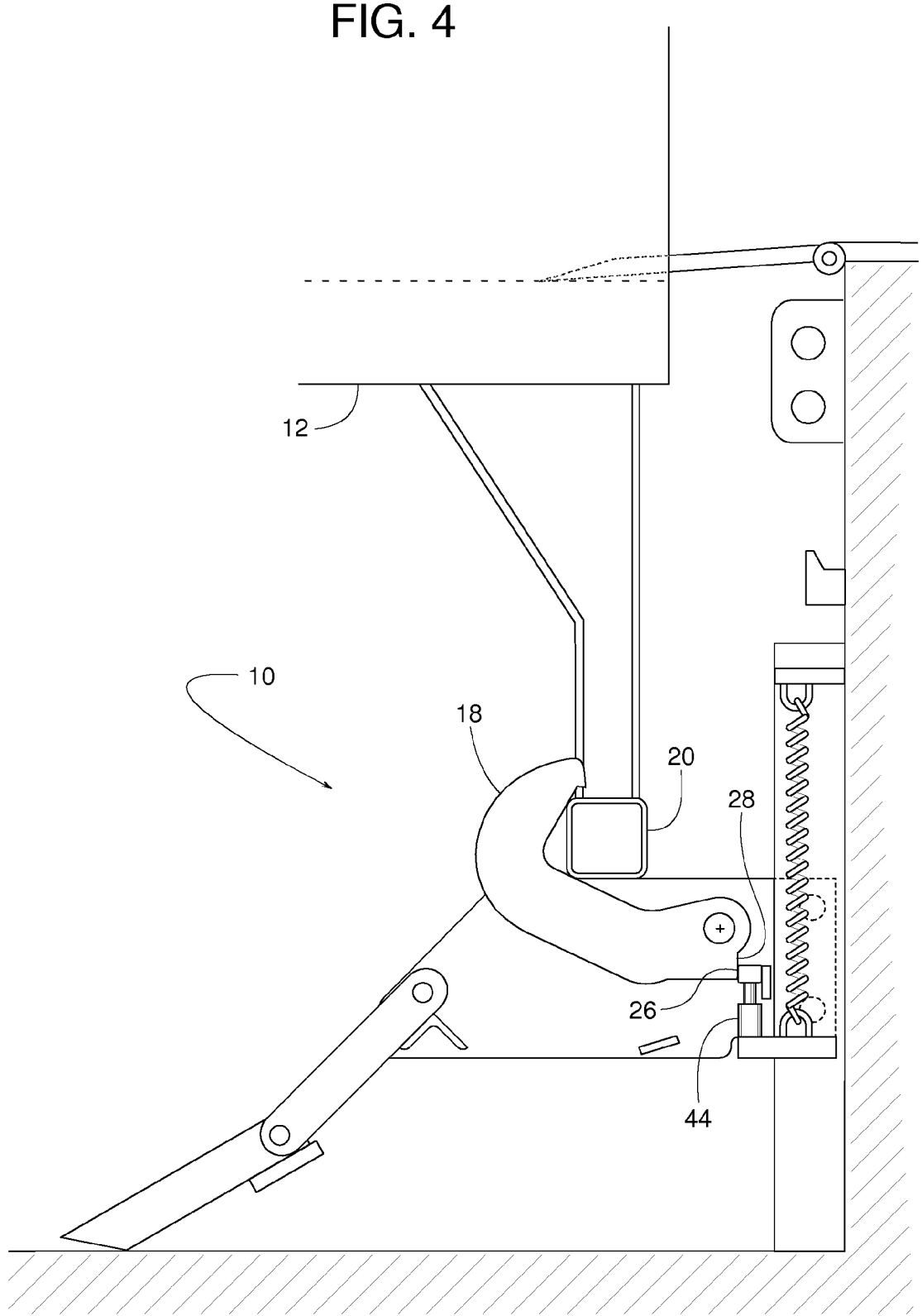
FIG. 4 is a side view similar to FIG. 1 but showing the example barrier at a first blocking position.
Figure 5:
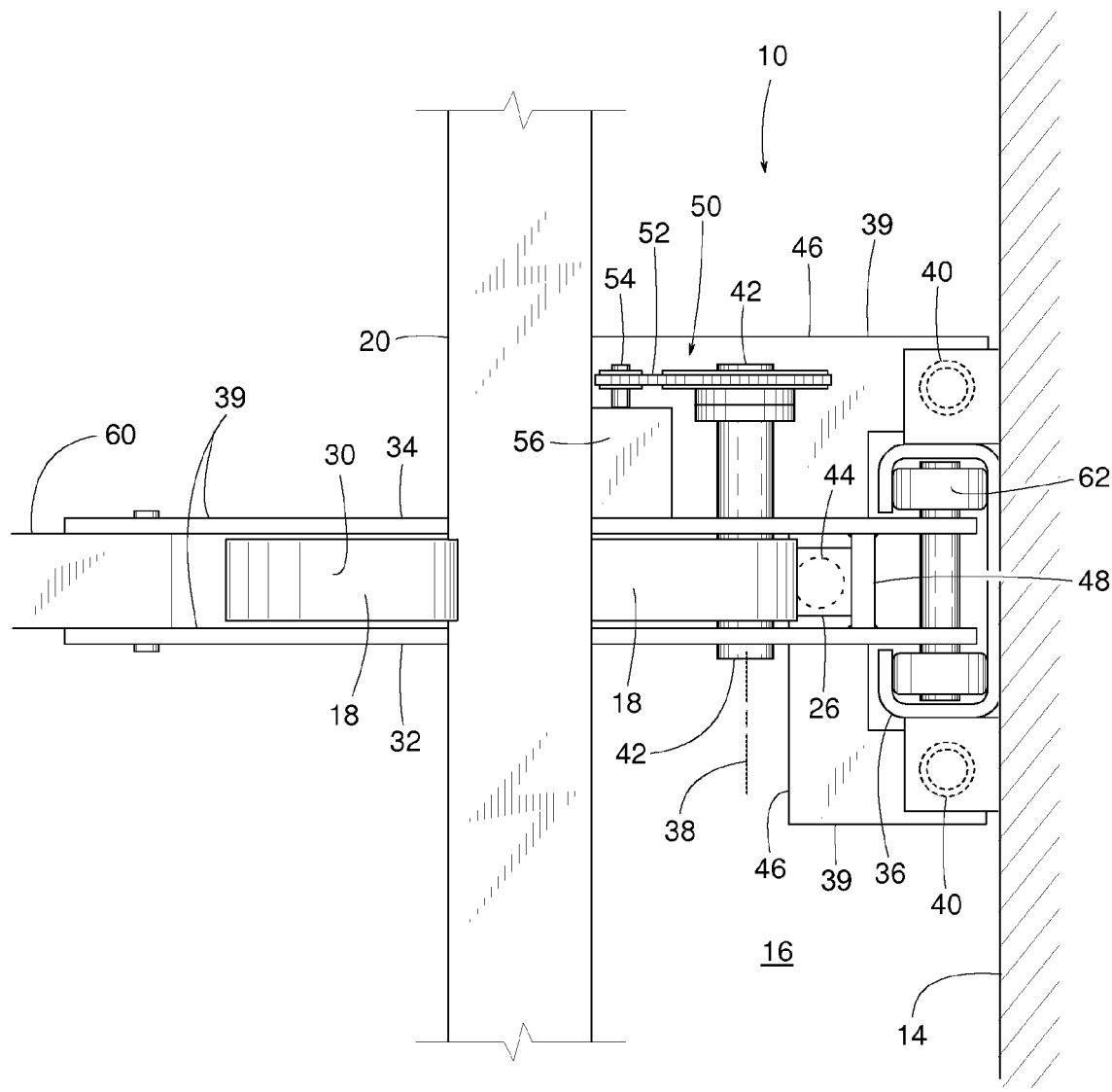
FIG. 5 is a top view of FIG. 4 with previously omitted parts now shown.
Figure 6:
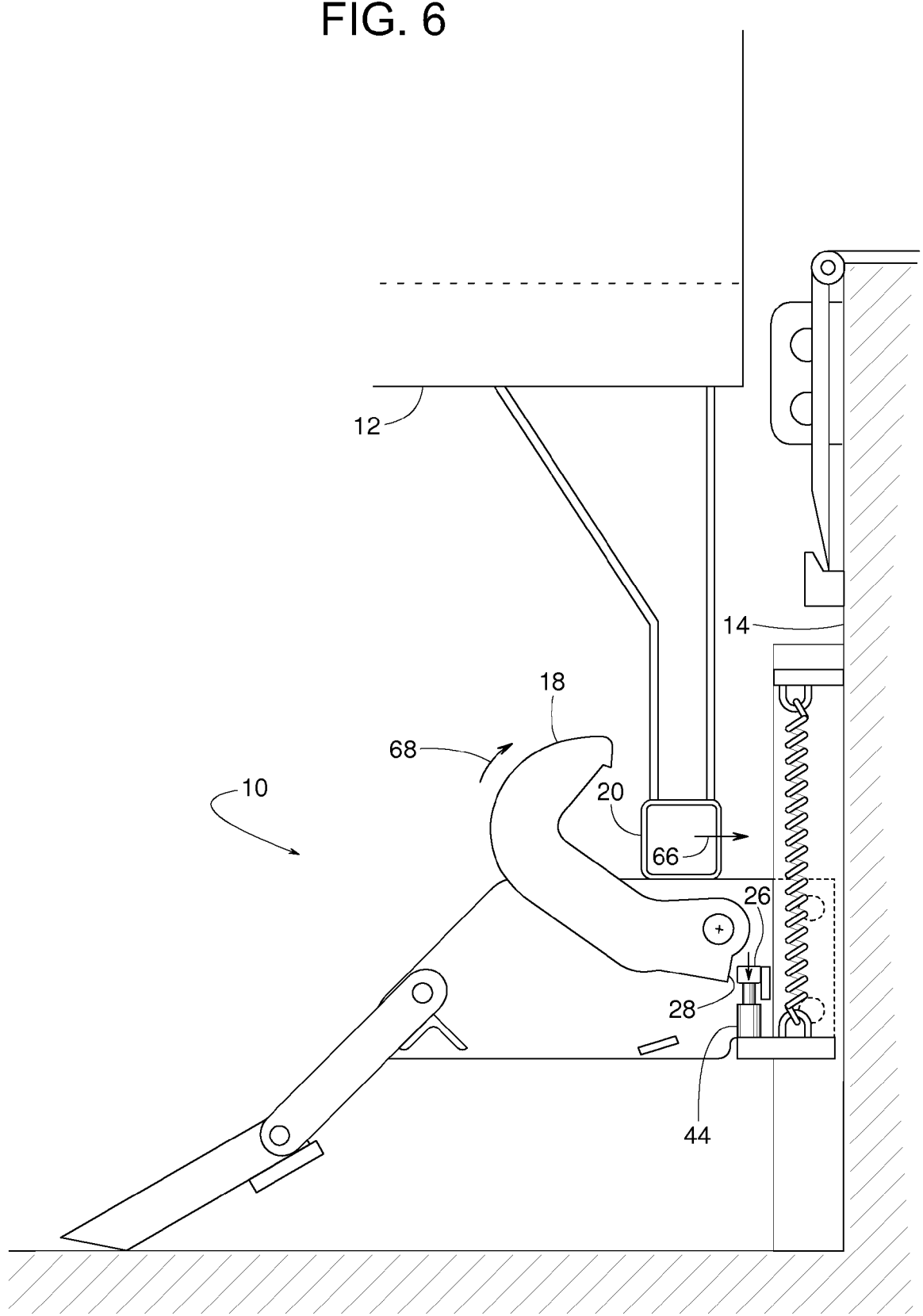
FIG. 6 is a side view similar to FIG. 4 but with arrows showing movement of the RIG and the example barrier.
Figure 7:
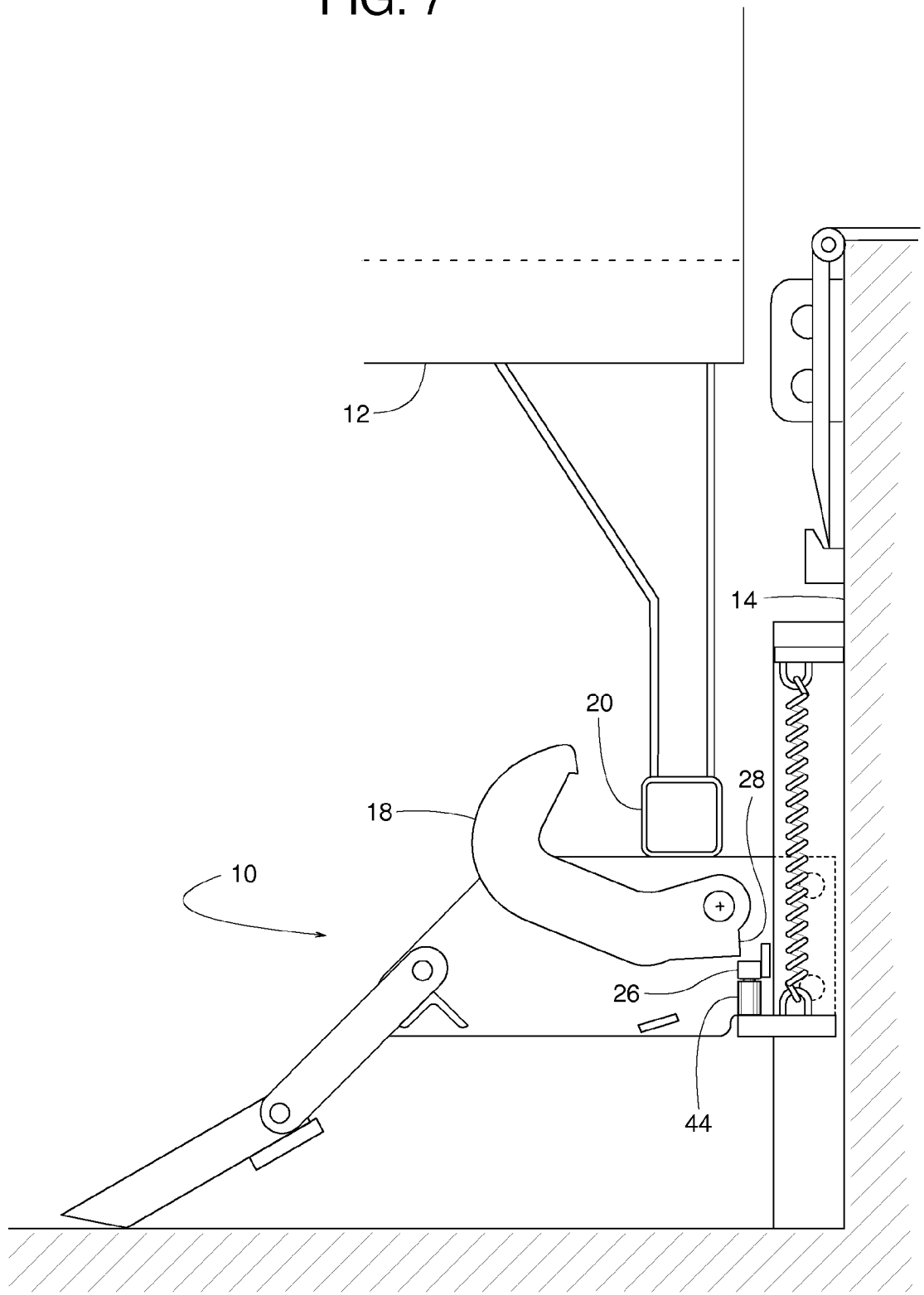
FIG. 7 is a side view similar to FIG. 4 but showing an example stop member disengaged from a feature of the example barrier.

To release the vehicle 12 from the condition shown in FIGS. 4 and 5, in some examples, the vehicle 12 first moves the RIG 20 towards the dock face 14, as indicated by an arrow 66 in FIG. 6, and then the motor 56 momentarily raises the barrier 18, as indicated by an arrow 68. This action disengages the feature 28 from the stop 26 to relieve the pressure therebetween, which allows the actuator 44 to retract the stop 26 to its release position. With stop the 26 in its release position, as shown in the illustrated example of FIG. 7, the motor 56 rotates the barrier 18 freely back down from its first blocking position (FIG. 7) to its stored position (FIGS. 1 and 2).

As mentioned earlier, the feature 28 being disposed on the back edge 30 of the barrier 18 offers several benefits including, but not limited to, providing the vehicle restraint 10 with a compact design; shielding the stop 26 and the feature 28 from contamination and impact; and reducing (e.g., preventing) the working mechanism of the stop 26 and the feature 28 from presenting an exposed pinch point. The expression, "back edge of a barrier" as used herein is best understood with reference to FIGS. 8-11. The barrier 18, for example, comprises a first side 70, a second side 72, a proximal end 74 pivotally coupled to the main body 39, a distal end 76, and an outer peripheral edge 78 lying between the sides 70, 72. In some examples, the outer edge 78 comprises an operative edge 80 and the back edge 30. The edges 80, 30 are individually identified by their own thick, bold line in FIGS. 8 and 9, respectively, to clearly show where those edges lie. Specifically, a line 84 tangent to the ends 74, 76, as shown in FIGS. 8 and 9, defines end points 86, 88 of the edges 80, 30. As shown in the illustrated examples, the line 84 also helps define the RIG-receiving area 64 as being the space between the line 84 and the operative edge 80. With the location of the operative edge 80 identified, the back edge 30 is the remainder of the outer peripheral edge 78 and lies beyond or outside of the RIG-receiving area 64.

Figure 12:
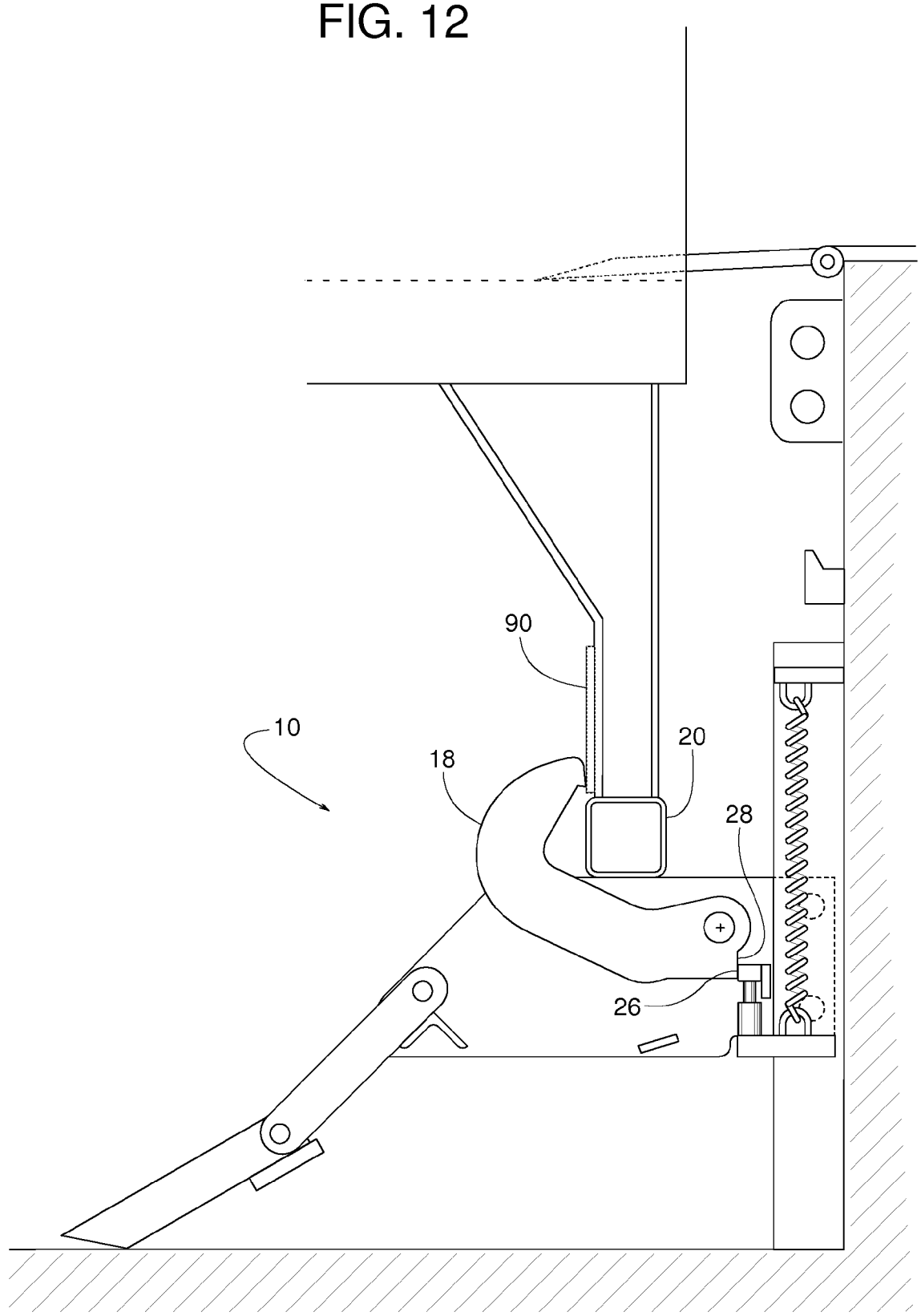
FIG. 12 is a side view similar to FIG. 4 but showing the example barrier blocking a different RIG.
Figure 13:
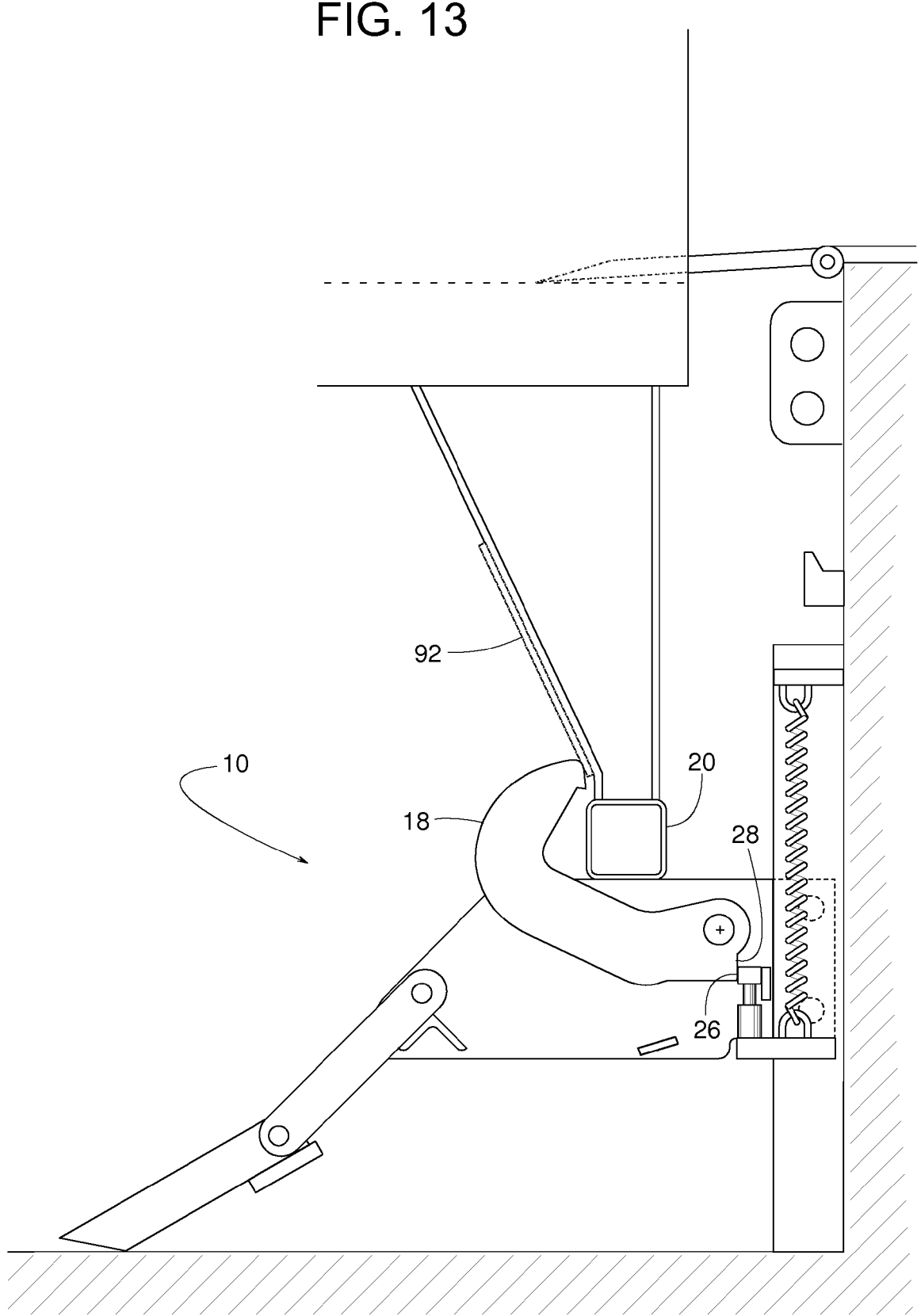
FIG. 13 is a side view similar to FIG. 12 but showing the example barrier blocking yet another style of RIG.

In some examples, a vehicle's RIG-supporting structure includes some sort of obstruction that prevents the barrier 18 from extending over the top of the RIG 20. Examples of such obstructions include a vertical plate 90 or an inclined plate 92, as shown in FIGS. 12 and 13, respectively. Nevertheless, in such examples, the barrier 18 at its first blocking position (FIGS. 12 and 13) can still provide the RIG 20 with ample restraint.

Figure 14:
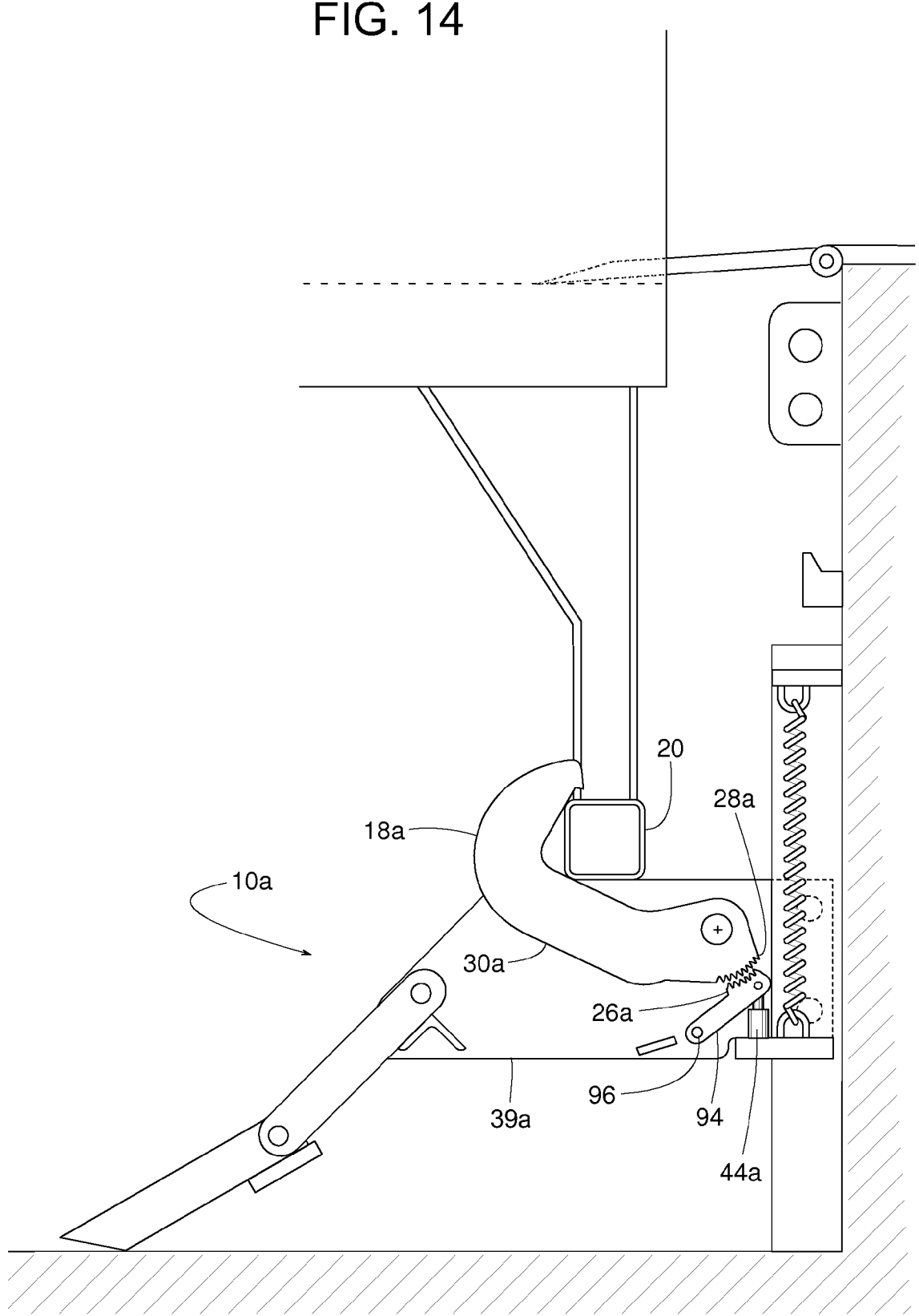
FIG. 14 is a side view similar to FIG. 7 but showing another example vehicle restraint.
Figure 15:
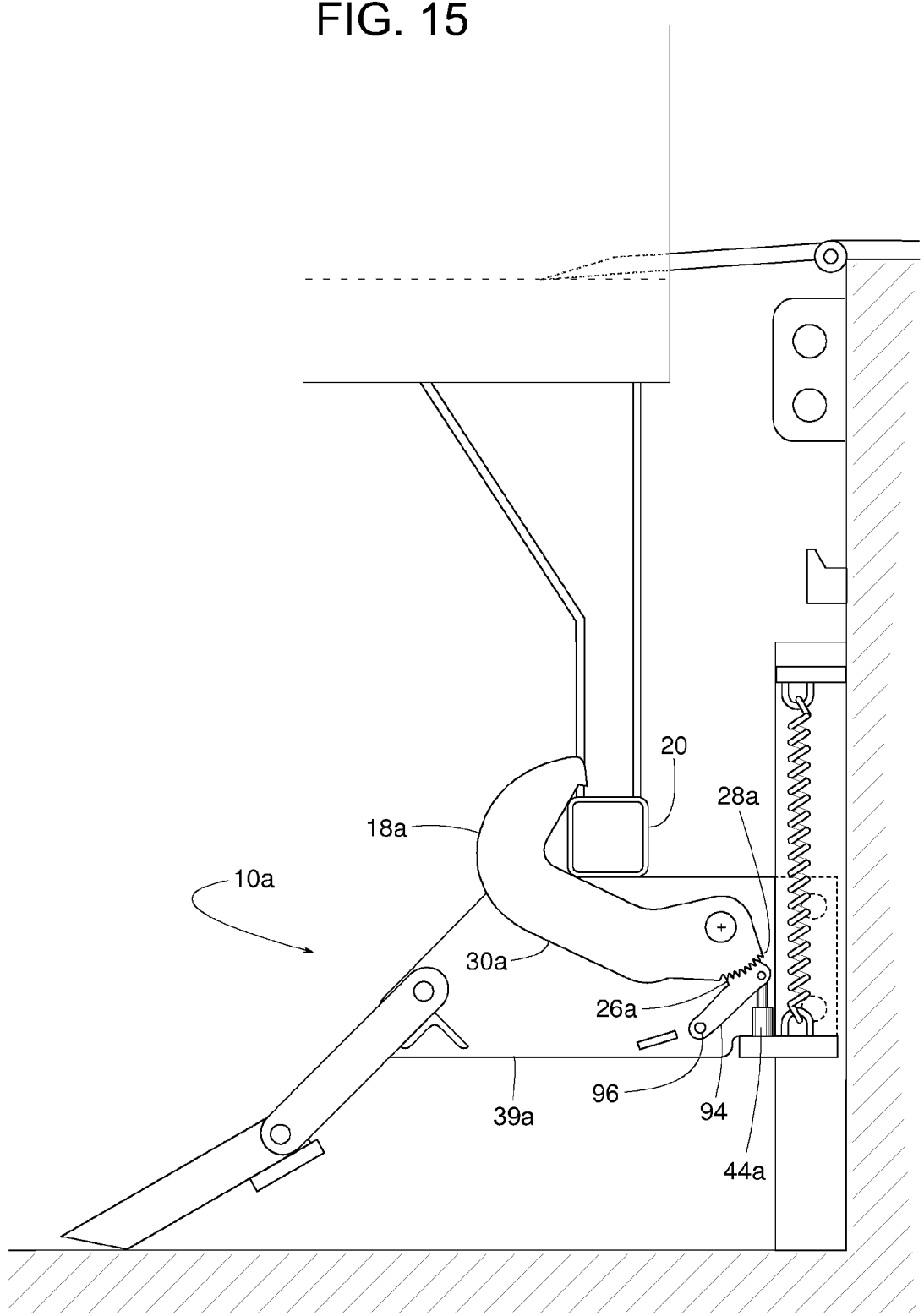
FIG. 15 is a side view similar to FIG. 4 but showing the example restraint of FIG. 14.

In another example, shown in FIGS. 14 and 15, a vehicle restraint 10a includes a different stop 26a and an engageable feature 28a. In this example, feature 28a is in the form of a plurality of teeth on a back edge 30a of a barrier 18a. The stop 26a, in this example, includes a mating plurality of teeth on a pivotal or otherwise movable member 94. In the illustrated example, an actuator 44a pivots the member 94 about a pin 96 supported by a main body 39a such that the actuator 44a pivots the stop 26a between a release position (FIG. 14) and a holding position (FIG. 15). Control of the actuator 44a, in the illustrated example, determines whether the teeth of the stop 26a and the feature 28a engage or disengage to respectively hold or release the barrier 18a from its first blocking position shown in FIGS. 14 and 15. In some examples, disengaging the stop 26a from the feature 28a allows the barrier 18a to pivot to a stored position (similar to FIG. 1) and/or a plurality of extended blocking positions (similar to FIG. 3).

Figure 16:
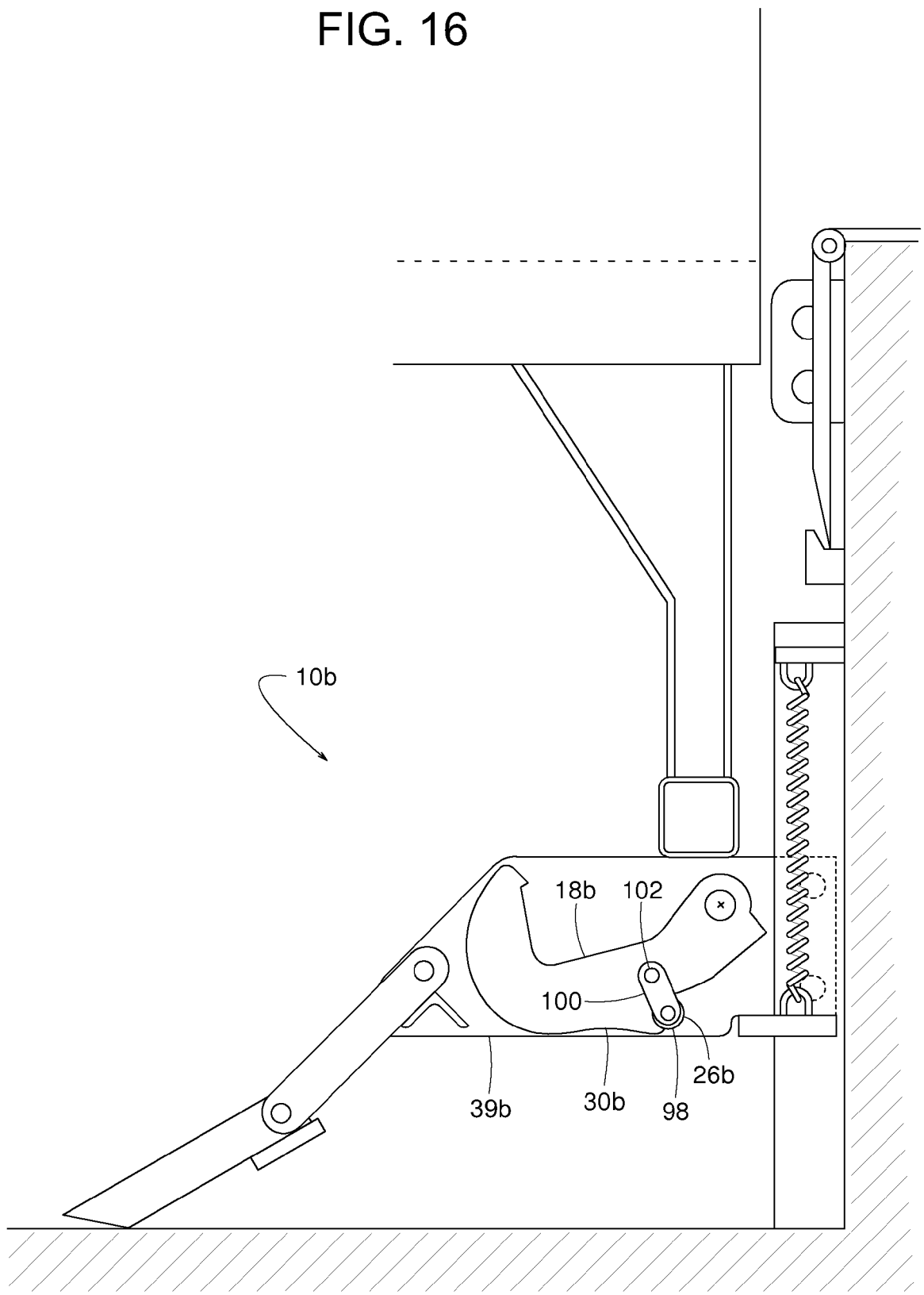
FIG. 16 is a side view showing another example of a vehicle restraint with another example barrier in a stored position.
Figure 17:
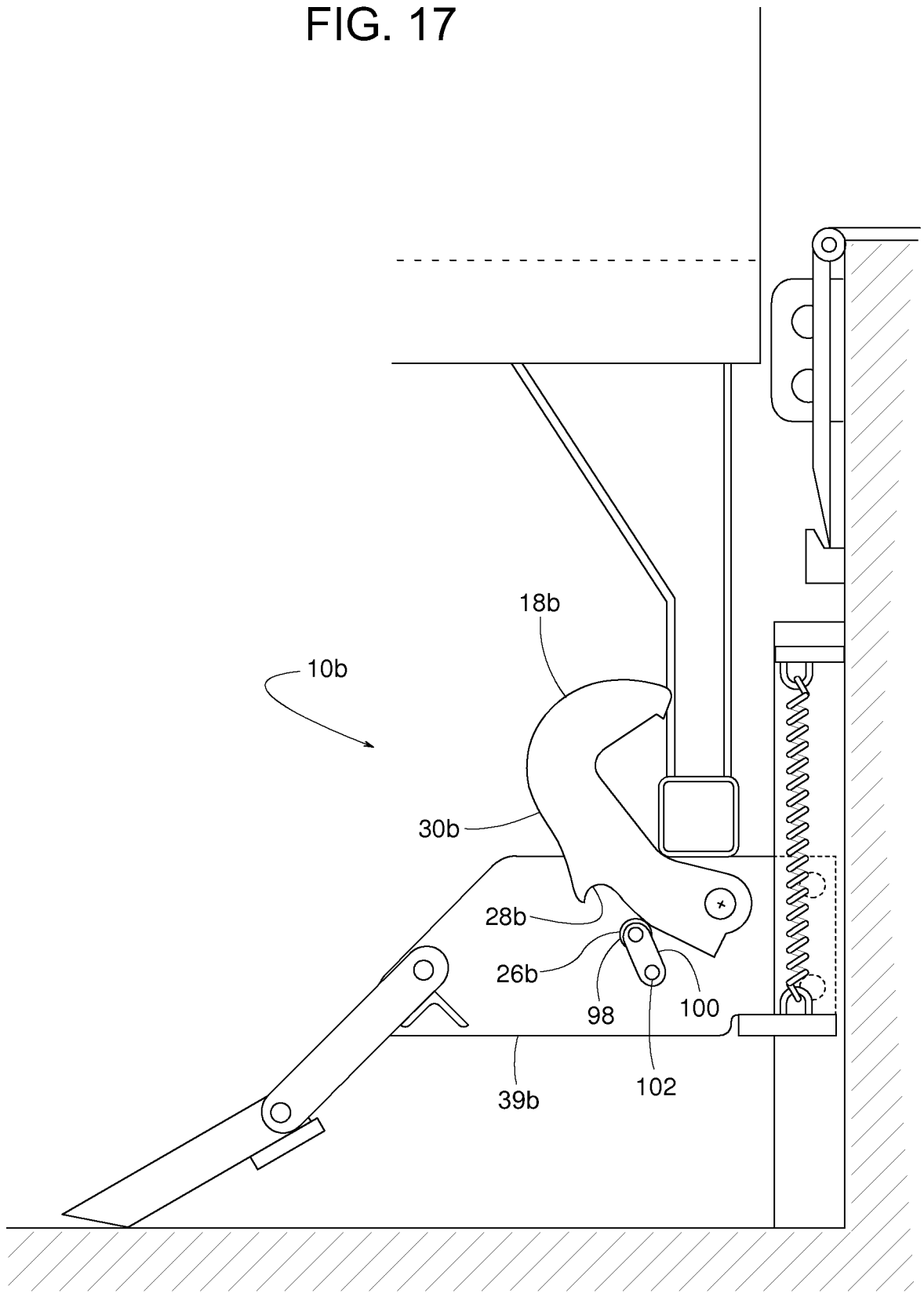
FIG. 17 is a side view similar to FIG. 16 but showing the example barrier in one of a plurality of extended blocking positions.
Figure 18:
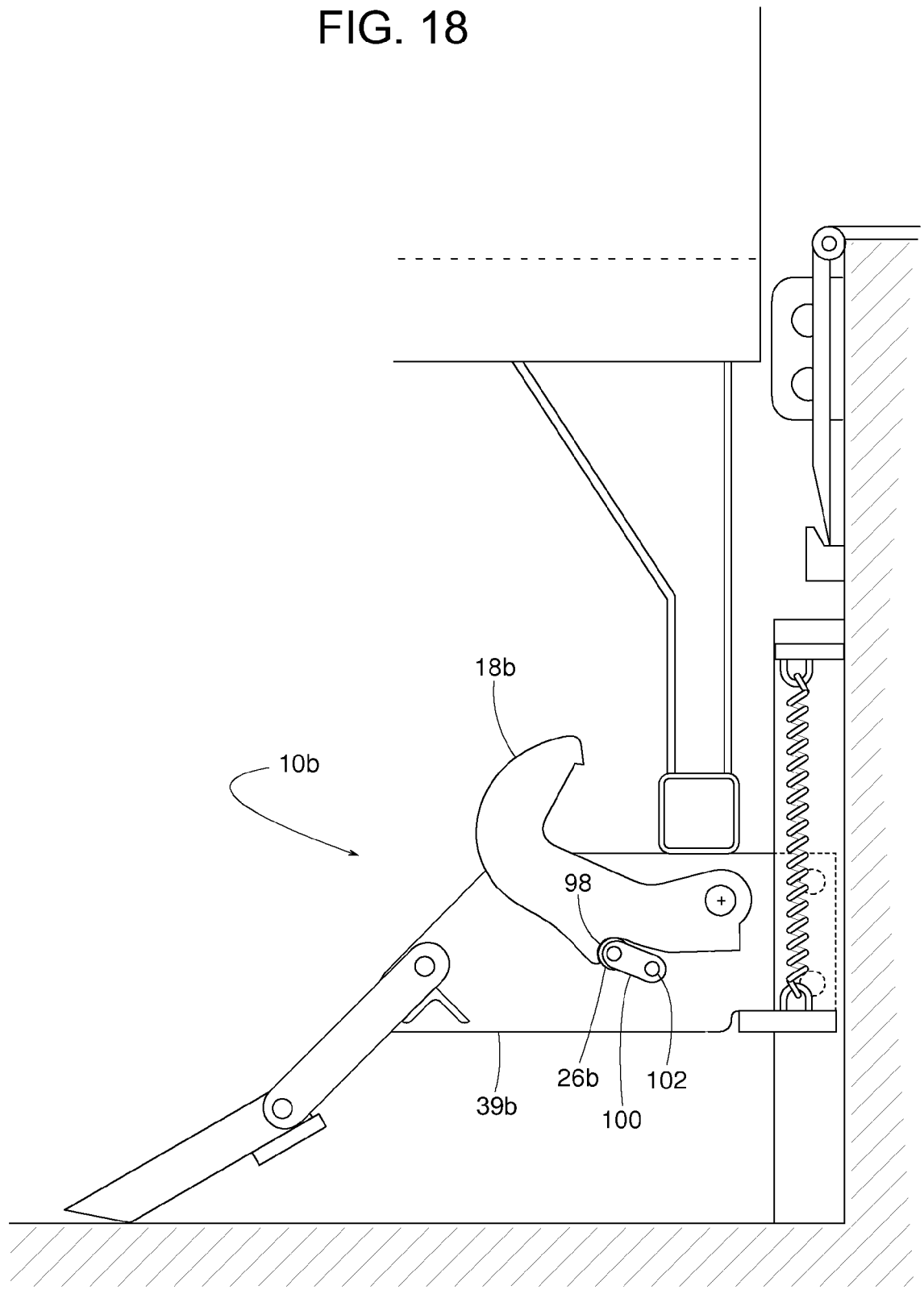
FIG. 18 is a side view similar to FIG. 17 but showing the example barrier at a first blocking position.

In another example, shown in FIGS. 16-18, a vehicle restraint 10b includes a stop 26b and an engageable feature 28b (FIG. 17). In this example, the feature 28b is in the form of a detent on a back edge 30b of a barrier 18b. The stop 26b, in this example, includes a roller 98 on a pivotal or otherwise movable member 100. In some examples, any actuator is coupled to the member 100 to pivot the member 100 about a pin 102 supported by a main body 39b such that the member 100 and the stop 26b pivot between a release position (FIG. 16) and a holding position (FIG. 18). In some examples, the vehicle restraint 10b also permits separation between the stop 26b and the feature 28b so that the barrier 18b can pivot to a plurality of extended blocking positions, such as the extended blocking position shown in FIG. 17.

Although certain example methods, apparatus and/or articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A vehicle restraint to engage a RIG (rear impact guard) of a vehicle at a loading dock, the vehicle restraint comprising:
    a main body mountable at the loading dock to move vertically relative to the loading dock, the main body including a first plate and a second plate that are spaced apart to define a barrier-receiving space therebetween;
    a barrier to extend into the barrier-receiving space, the barrier including a first side, a second side, a proximal end, a distal end, and an outer peripheral edge extending between the first side and the second side, the outer peripheral edge including an operative edge extending between the proximal end and the distal end and a back edge extending between the proximal end and the distal end, the proximal end being pivotally coupled to the main body and being interposed between the first plate and the second plate, the distal end being selectively movable relative to the main body to a first blocking position to block the RIG, a plurality of extended blocking positions beyond the first blocking position, and a stored position to release the RIG, the distal end relative to the main body being higher in the first blocking position than in the stored position, the first side of the barrier generally facing the first plate of the main body when the distal end is in the stored position, the second side of the barrier generally facing the second plate of the main body when the distal end is in the stored position, the barrier providing a RIG-receiving area defined by the operative edge, the back edge being disposed outside of the RIG-receiving area, the barrier to encircle an axis about which the barrier is to pivot relative to the main body, the back edge being disposed outside of and generally opposite the RIG-receiving area;
    an engageable feature projecting from the back edge of the barrier; and
    a stop coupled to the main body and being selectively moveable between a release position and a holding position, the stop to engage the engageable feature of the back edge when the distal end is at the first blocking position while the stop is at the holding position, the stop being spaced apart from the engageable feature when the distal end is at the first blocking position while the stop is at the release position, and the stop being spaced apart from the engageable feature when the distal end is in the stored position.

2. The vehicle restraint of claim 1, wherein the stop is to be spaced apart from the engageable feature when the distal end is at one of the plurality of extended blocking positions regardless of whether the stop is at the release position or the holding position.

3. The vehicle restraint of claim 1, wherein the engageable feature is a protrusion extending from the back edge of the barrier.

4. The vehicle restraint of claim 1, wherein the engageable feature includes a plurality of teeth disposed on the back edge of the barrier.

5. The vehicle restraint of claim 1, wherein the barrier and the engageable feature are of a unitary piece.

6. The vehicle restraint of claim 1, wherein the stop includes a roller.

7. The vehicle restraint of claim 1, wherein the stop includes a plurality of teeth.

8. The vehicle restraint of claim 1, wherein the stop is pivotal between the release position and the holding position.

9. The vehicle restraint of claim 1, further comprising a backup support coupled to the main body, the stop being movable relative to the backup support, the stop being interposed between the backup support and the engageable feature when the distal end of the barrier is in the first blocking position while the stop is in the holding position.

10. The vehicle restraint of claim 1, further comprising a hydraulic actuator coupled to the stop to move the stop between the holding position and the release position.

11. The vehicle restraint of claim 1, further comprising a track mountable to the loading dock to support the main body with the main body being vertically movable along the track.

12. The vehicle restraint of claim 11, wherein the track is closer to the stop than to the axis about which the barrier is to pivot.

13. A vehicle restraint to engage a RIG (rear impact guard) of a vehicle at a loading dock, the vehicle restraint comprising:
    a main body to move vertically relative to the loading dock, the main body including a first plate and a second plate that are spaced apart to define a barrier-receiving space therebetween;
    a barrier extending into the barrier-receiving space and including a first side, a second side, a proximal end, a distal end, and an outer peripheral edge extending between the first side and the second side, the outer peripheral edge including an operative edge extending between the proximal end and the distal end and a back edge extending between the proximal end and the distal end, the proximal end being pivotally coupled to the main body and being interposed between the first plate and the second plate, the distal end being selectively movable relative to the main body to a first blocking position to block the RIG, a plurality of extended blocking positions beyond the first blocking position, and a stored position to release the RIG, the distal end relative to the main body being higher in the first blocking position than in the stored position, the first side of the barrier generally facing the first plate of the main body when the distal end is in the stored position, the second side of the barrier generally facing the second plate of the main body when the distal end is in the stored position, the barrier providing a RIG-receiving area defined by the operative edge, the back edge being disposed outside of the RIG-receiving area, the barrier encircling an axis about which the barrier is to pivot relative to the main body, the axis being at a substantially fixed location relative to the main body;

an engageable structure including a protrusion extending from the back edge of the barrier, the barrier and the engageable structure being a unitary piece; and a stop coupled to the main body and being selectively moveable between a release position and a holding position, the stop to engage the engageable structure of the back edge of the barrier when the distal end is at the first blocking position while the stop is at the holding position, the stop being spaced apart from the engageable structure when the distal end is at the first blocking position while the stop is at the release position, the stop being spaced apart from the engageable structure when the distal end is in the stored position, and, the stop being spaced apart from the engageable structure when the distal end is at one of the plurality of extended blocking positions regardless of whether the stop is at the release position or the holding position.

14. A vehicle restraint to engage a RIG (rear impact guard) of a vehicle at a loading dock, the vehicle restraint comprising:

a main body to move vertically relative to the loading dock, the main body including a first plate and a second plate that are spaced apart to define a barrier-receiving space therebetween;

a barrier extending into the barrier-receiving space and including a first side, a second side, a proximal end, a distal end, and an outer peripheral edge extending between the first side and the second side, the outer peripheral edge including an operative edge extending between the proximal end and the distal end and a back edge extending between the proximal end and the distal end, the proximal end being pivotally coupled to the main body and being interposed between the first plate and the second plate, the distal end being selectively movable relative to the main body to a first blocking position to block the RIG, a plurality of extended blocking positions beyond the first blocking position, and a stored position to release the RIG, the distal end relative to the main body being higher in the first blocking position than in the stored position, the first side of the barrier generally facing the first plate of the main body when the distal end is in the stored position, the second side of the barrier generally facing the second plate of the main body when the distal end is in the stored position, the barrier providing a RIG-receiving area defined by the operative edge, the back edge being disposed outside of the RIG-receiving area, the barrier encircling an axis about which the barrier is to pivot relative to the main body, the axis being at a substantially fixed location relative to the main body;

an engageable structure provided by the back edge of the barrier, the barrier and the engageable structure being a unitary piece, the engageable structure including a first plurality of teeth disposed on the back edge of the barrier; and a stop coupled to the main body and being selectively moveable between a release position and a holding position, the stop including a second plurality of teeth engageable with the first plurality of teeth, the stop to engage the engageable structure of the back edge of the barrier when the distal end is at the first blocking position while the stop is at the holding position, the stop being spaced apart from the engageable structure when the distal end is at the first blocking position while the stop is at the release position, the stop being spaced apart from the engageable structure when the distal end is in the stored position, and, the stop being spaced apart from the engageable structure when the distal end is at one of the plurality of extended blocking positions regardless of whether the stop is at the release position or the holding position.

15. A vehicle restraint to engage a RIG (rear impact guard) of a vehicle at a loading dock, the vehicle restraint comprising:

a main body to move vertically relative to the loading dock, the main body including a first plate and a second plate that are spaced apart to define a barrier-receiving space therebetween;

a barrier extending into the barrier-receiving space and including a first side, a second side, a proximal end, a distal end, and an outer peripheral edge extending between the first side and the second side, the outer peripheral edge including an operative edge extending between the proximal end and the distal end and a back edge extending between the proximal end and the distal end, the proximal end being pivotally coupled to the main body and being interposed between the first plate and the second plate, the distal end being selectively movable relative to the main body to a first blocking position to block the RIG, a plurality of extended blocking positions beyond the first blocking position, and a stored position to release the RIG, the distal end relative to the main body being higher in the first blocking position than in the stored position, the first side of the barrier generally facing the first plate of the main body when the distal end is in the stored position, the second side of the barrier generally facing the second plate of the main body when the distal end is in the stored position, the barrier providing a RIG-receiving area defined by the operative edge, the back edge being disposed outside of the RIG-receiving area, the barrier encircling an axis about which the barrier is to pivot relative to the main body, the axis being at a substantially fixed location relative to the main body;

an engageable structure provided by the back edge of the barrier, the barrier and the engageable structure being a unitary piece; and a stop including a roller, the stop coupled to the main body and being selectively moveable between a release position and a holding position, the stop to engage the engageable structure of the back edge of the barrier when the distal end is at the first blocking position while the stop is at the holding position, the stop being spaced apart from the engageable structure when the distal end is at the first blocking position while the stop is at the release position, the stop being spaced apart from the engageable structure when the distal end is in the stored position, and, the stop being spaced apart from the engageable structure when the distal end is at one of the plurality of extended blocking positions regardless of whether the stop is at the release position or the holding position.

16. The vehicle restraint of claim 13, further comprising a backup support coupled to the main body, the stop being movable relative to the backup support, the stop being interposed between the backup support and the engageable structure when the distal end of the barrier is in the first blocking position while the stop is in the holding position.

17. The vehicle restraint of claim 13, further comprising a track mountable to the loading dock and supporting the main body, the main body being vertically movable along the track, the track being closer to the stop than to the axis about which the barrier is to pivot.

18. A vehicle restraint to engage a RIG (rear impact guard) of a vehicle at a loading dock, the vehicle restraint comprising:
   a main body mountable at the loading dock;
   a barrier including a proximal end, a distal end, an operative edge extending between the proximal end and the distal end along a first portion of an outer peripheral edge of the barrier, and a back edge extending between the proximal end and the distal end along a remaining portion of the outer peripheral edge, the proximal end of the barrier pivotally coupled to the main body to enable the barrier to pivot about an axis relative to the main body, the distal end being selectively movable about the axis to a first blocking position, a plurality of extended blocking positions beyond the first blocking position, and a stored position, the distal end being higher relative to the main body in the first blocking position than in the stored position, the operative edge of the barrier and a line lying between the proximal end and the distal end of the barrier defining an area to receive and block the RIG;
   an engageable protrusion extending from the back edge of the barrier, the barrier and the engageable protrusion being a unitary piece;
   a stop coupled to the main body and being selectively moveable between a release position and a holding position, the stop to engage the engageable protrusion of the back edge when the distal end is at the first blocking position while the stop is at the holding position, the stop being spaced apart from the engageable protrusion when the distal end is at the first blocking position while the stop is at the release position, the stop being spaced apart from the engageable protrusion when the distal end is in the stored position, and, the stop being spaced apart from the engageable protrusion when the distal end is at one of the plurality of extended blocking positions regardless of whether the stop is at the release position or the holding position;
   a hydraulic actuator to be coupled to the stop to move the stop between the holding position and the release position; and
   a backup support coupled to the main body, the stop being movable relative to the backup support, the stop being interposed between the backup support and the engageable protrusion when the distal end of the barrier is in the first blocking position while the stop is in the holding position.

19. The vehicle restraint of claim 18, further comprising a track mountable to the loading dock and supporting the main body, the main body being vertically movable along the track, the track to be closer to the stop than to the axis about which the barrier is to pivot.

20. The vehicle restraint of claim 13, wherein the stop includes a roller.

* * * * *